United States Patent
Dai et al.

(10) Patent No.: US 8,514,925 B2
(45) Date of Patent: Aug. 20, 2013

(54) METHODS AND APPARATUS FOR JOINT ADAPTATION OF TRANSMITTER TRANSVERSAL FILTER IN COMMUNICATION DEVICES

(75) Inventors: Xingdong Dai, Whitehall, PA (US); Dwight D. Daugherty, Ephrata, PA (US); Max J. Olsen, Mertztown, PA (US); Geoffrey Zhang, Allentown, PA (US)

(73) Assignee: Agere Systems LLC, Allentown, PA (US)

( * ) Notice: Subject to any disclaimer, the term of this patent is extended or adjusted under 35 U.S.C. 154(b) by 835 days.

(21) Appl. No.: 12/178,301

(22) Filed: Jul. 23, 2008

(65) Prior Publication Data

US 2010/0020860 A1    Jan. 28, 2010

(51) Int. Cl.
*H03H 7/30* (2006.01)
(52) U.S. Cl.
USPC ........... 375/233; 375/229; 375/230; 375/232; 375/235
(58) Field of Classification Search
USPC ............. 375/231–233; 333/18, 28; 708/300, 708/819
See application file for complete search history.

(56) References Cited

U.S. PATENT DOCUMENTS

| | | | | |
|---|---|---|---|---|
| 5,841,809 A * | 11/1998 | Koizumi et al. | ............... | 375/233 |
| 6,084,907 A * | 7/2000 | Nagano et al. | ................ | 375/230 |
| 7,447,260 B2 * | 11/2008 | Takahashi | ..................... | 375/229 |
| 7,720,135 B2 * | 5/2010 | Booth et al. | .................. | 375/219 |
| 7,746,924 B2 * | 6/2010 | Bois et al. | ..................... | 375/232 |
| 2004/0047409 A1 * | 3/2004 | Lee et al. | ....................... | 375/232 |
| 2007/0025436 A1 * | 2/2007 | Shumarayev et al. | ......... | 375/233 |
| 2008/0151792 A1 * | 6/2008 | Taich et al. | .................... | 370/294 |
| 2009/0304054 A1 * | 12/2009 | Tonietto et al. | ............... | 375/221 |
| 2010/0142607 A1 * | 6/2010 | Kim et al. | ..................... | 375/232 |

* cited by examiner

*Primary Examiner* — Dhaval Patel
(74) *Attorney, Agent, or Firm* — Ryan, Mason & Lewis, LLP

(57) ABSTRACT

Methods and apparatus are provided for joint adaptation of filter values in two communicating devices, such as a link partner and a link device. The disclosed joint adaptation process initially adapts the filter coefficient values in a first of the two communicating devices until a predefined stopping criteria is satisfied. Thereafter, the filter coefficient values in a second of the two communicating devices are adapted once the predefined stopping criteria for the first communicating device is satisfied. The filter coefficient values can comprise coefficient values of a multi-tap filter. The predefined stopping criteria may determine, for example, whether the first of the two communicating devices is overequalized. The filter coefficient values can be determined by including a contribution of only certain cursor tap values of the channel impulse response.

25 Claims, 8 Drawing Sheets

XGMII: 10G MEDIA INDEPENDENT INTERFACE
PCS: PHYSICAL CODING SUBLAYER
FEC: FORWARD ERROR CORRECTION (OPTIONAL)
PMA: PHYSICAL MEDIUM ATTACHMENT
PMD: PHYSICAL MEDIUM DEPENDENT
AN: AUTO-NEGOTIATION
MDI: MEDIUM DEPENDENT INTERFACE

| CURSOR POSITION | MAPPED PROFILE VALUES OF $p$ | | |
|---|---|---|---|
| | ALGORITHM - I | ALGORITHM - II | ALGORITHM - III |
| PRE-CURSOR | [0,1,0,0,0,0,0] | [1,1,0,0,0,0,0] | [1,1,0,0,0,0,0] |
| MAIN CURSOR | [0,0,1,0,0,0,0] | [0,0,1,0,0,0,0] | [0,0,1,0,0,0,0] |
| POST-CURSOR | [0,0,0,1,0,0,0] | [0,0,0,0,1,0,0] | [0,0,0,1,1,1,1] |

800

METHODS AND APPARATUS FOR JOINT ADAPTATION OF TRANSMITTER TRANSVERSAL FILTER IN COMMUNICATION DEVICES

FIELD OF THE INVENTION

The present invention relates generally to filter coefficient adaptation techniques for digital communications, and more particularly, to techniques for joint adaptation of filter coefficient values in communicating devices, such as a link partner and a link device.

BACKGROUND OF THE INVENTION

10 Gigabit Ethernet (10GbE) is a set of Ethernet standards with a nominal data rate of 10.3125 Gbit/s. 10GbE over fiber, copper cabling and twisted pair are specified by the IEEE 802.3 standard. IEEE 802.3 is a collection of standards defining the physical layer, and the media access control (MAC) sublayer of the data link layer for wired Ethernet. IEEE 802.3ap, for example, provides a standard for Backplane Ethernet over printed circuit boards, with rates of 1.25 and 10.3125 Gbit/s.

The IEEE 802.3ap standard defines the physical medium dependent sublayer (PMD) control function. The PMD control function implements the 10GBASE-KR start-up protocol, which provides a joint adaptation mechanism through which the local receiver can tune the link-partner transmit equalizer to optimize performance over the backplane interconnect, and to inform the link partner when training is complete and it is ready to receive data. This mechanism is implemented through the continuous exchange of fixed-length training frames. These training frames are used by the two physical layer devices to exchange control and status information necessary to configure the adaptive equalization filters for both devices.

A number of joint equalization adaptation techniques have been proposed or suggested for use with the 10GBASE-KR standard. These existing techniques, however, are typically based on a primitive eye diagram visual examination or on an incomplete mathematical derivation, with inadequate assumptions. Consequently, the resulting implementations are not sufficient or complete. More often, these existing proposals are overly complicated, and may degrade the overall link performance.

A need therefore exists for improved methods and apparatus for joint adaptation of the transmitter transversal filter in Serializer-Deserializer (SerDes) devices.

SUMMARY OF THE INVENTION

Generally, methods and apparatus are provided for joint adaptation of filter values in two communicating devices, such as a link partner and a link device. The disclosed joint adaptation process initially adapts the filter coefficient values in a first of the two communicating devices until a predefined stopping criteria is satisfied. Thereafter, the filter coefficient values in a second of the two communicating devices are adapted once the predefined stopping criteria for the first communicating device is satisfied.

The filter coefficient values can comprise coefficient values of a multi-tap filter. For example, the filter coefficient values in the first communicating device may comprise coefficient values of a finite impulse response filter in a transmitter of a link partner, while the filter coefficient values in the second communicating device comprise parameter values of a decision feedback equalizer in a receiver of a link device.

The predefined stopping criteria may determine, for example, whether the first of the two communicating devices is overequalized. Once the predefined stopping criteria for the first communicating device is satisfied, the disclosed process can optionally maintain the filter coefficient values in the first communicating device.

In exemplary implementations, the filter coefficient values are determined by including a contribution of (i) only a main-cursor channel impulse response; (ii) only a main-cursor, a first post-cursor and a first pre-cursor channel impulse response; and (iii) a main-cursor, a first pre-cursor and at least one post-cursor channel impulse response. Programmable profile values can optionally be stored in a register or another memory device, wherein the one or more programmable profile values indicate cursor tap values that contribute to the filter coefficient values.

A more complete understanding of the present invention, as well as further features and advantages of the present invention, will be obtained by reference to the following detailed description and drawings.

DETAILED DESCRIPTION

The present invention provides methods and apparatus for joint adaptation of the transmitter transversal filter. According to one aspect of the present invention, the disclosed joint adaptation algorithm provides a means to control the amount of equalization as well as the transmitter output amplitude. As a result, (i) link channel equalization is shared between the TX and the RX, and the ratio of distribution is controllable; (ii) the overall system power consumption is reduced; and (iii) the impact of noise and crosstalk on the received signal is minimized, thus permitting a better signal integrity in the system. Among other benefits, the computational complexity of the disclosed algorithms is reduced relative to existing adaptation algorithms, which can directly translate into area and cost savings for a hardware implementation.

Figure 1:
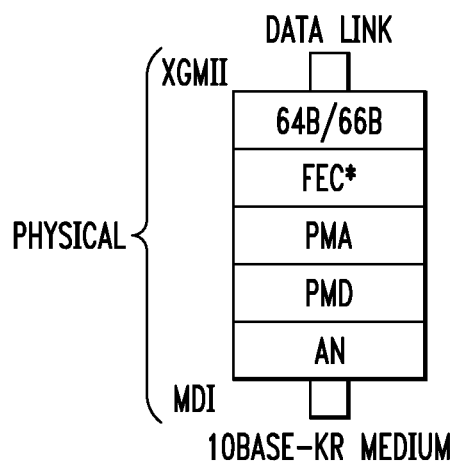
FIG. 1 illustrates the ISO Open System Interconnection reference model for 10GBASE-KR from IEEE draft P802.3ap.

FIG. 1 illustrates the ISO Open System Interconnection (OSI) reference model for 10GBASE-KR from IEEE draft P802.3ap. As previously indicated, the physical medium dependent (PMD) sub-layer implements the 10GBASE-KR start-up protocol and brings the physical layer (PHY) from initialization to a mode in which data may be exchanged with the link partner (LP). The 10GBASE-KR start-up protocol provides a joint adaptation mechanism through which the local receiver can tune the link-partner transmit equalizer (and vice versa) to optimize performance over the backplane interconnect, and to inform the link partner when training is complete and it is ready to receive data.

Figure 2:
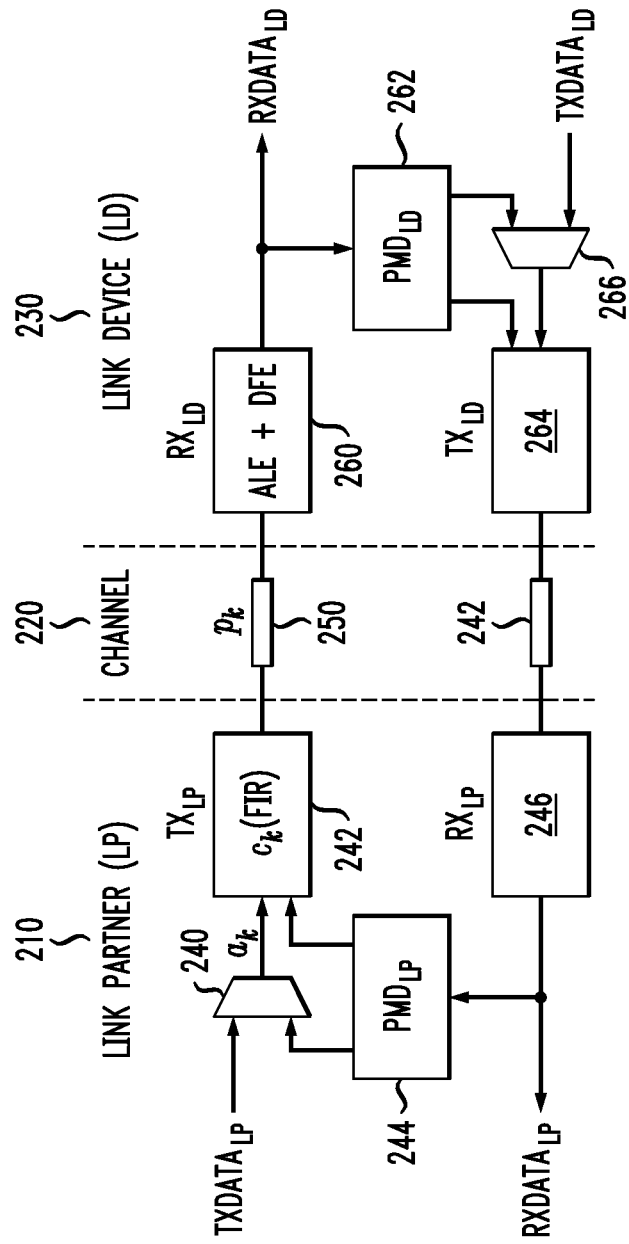
FIG. 2 is a schematic block diagram of a link partner and a link device communicating over a channel to implement a joint adaptive equalization process.

FIG. 2 is a schematic block diagram of a link partner (LP) 210 and a link device (LD) 230 communicating over a channel 220 to implement a joint adaptive equalization process. A 10GBASE-KR PHY is required to transmit and receive training frames during the startup protocol. The training frames are transmitted and received repeatedly until both devices (LP and LD) reach an agreement on the control information necessary to configure their adaptive equalization filters. In general, the receiver indicates the emphasis parameters (coefficient values for pre, main, and post cursors in a finite impulse response filter) to the transmitter, in a known manner.

As shown in FIG. 2, on the transmit path of the link partner 210, the transmit data ($TXDATA_{LP}$) is applied to a multiplexer 240, together with an output from the PMD 244. As indicated above, PMD 244 and 262 allow a link device 230 to adjust the TX filter coefficients of its link partner 210. Following equalization 242, the signal is transmitted across the channel 250 to the link device 230. On the receive path of the link device 230, the received signal is processed by an analog linear equalizer (ALE) and decision feedback equalizer (DFE) 260 to generate the recovered data $RXDATA_{LD}$. The recovered data $RXDATA_{LD}$ is also applied to the PMD layer 262 of the link device 230.

Figure 3:
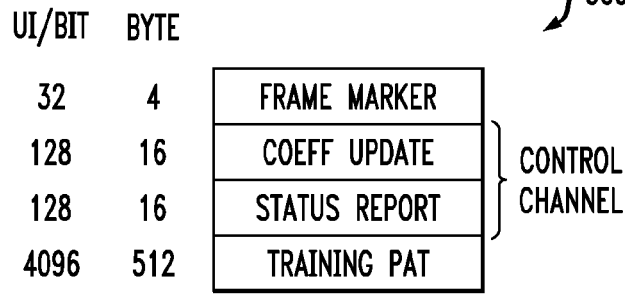
FIG. 3 illustrates an exemplary training frame structure in accordance with the IEEE 802.3ap standard.

FIG. 3 illustrates an exemplary training frame structure 300 in accordance with the IEEE 802.3ap standard. As shown in FIG. 3, the exemplary training frame structure 300 comprises a four octet frame marker, a 16 octet (1 octet=8 bits) coefficient update (e.g., instructions for FIR coefficient settings of link partner transmitter), a 16 octet status report and a 512 octet PN11 training pattern. The four octet frame marker delimits each frame using a 32-bit pattern, hexadecimal FFFF0000. This pattern is said to provide a unique indication of the start of a training frame. The next two fields for the coefficient update and status report (256 bits) are transmitted using Differential Manchester Encoding (DME), as discussed further below in conjunction with FIG. 2. Finally, the 512 octet PN11 training pattern is transmitted.

A 10GBASE-KR device is often required to transmit and receive training frames 300 during the startup protocol. The training frames are transmitted (and received) repeatedly until both devices reach an agreement on the control information necessary to configure their adaptive equalization filters. Each frame includes 4384 bits of data. These bits are typically transmitted at the 10G speed (1 bit per Unit Interval). In 10GBASE-KR, the control channel is signaled using differential Manchester encoding (DME). Every bit of the control channel is transmitted in eight unit intervals (UIs). The training pattern is required to be a 512 byte pattern of PRBS11 and 2 zero bits. As specified, each frame will have 4384 bits of data.

Through the use of PMD, 10GBASE-KR provides a means for a link device to adjust the TX filter coefficients of its link partner. The 10GBASE-KR standard, however, does not specify how and in what way the TX equalization shall be done with respect to the receiver decision feedback equalization (DFE). The only constraint is a maximum time limit of 500 ms. It can be shown that when both RX and TX adaptation are carried out concurrently, equalization parameters can experience very large perturbations, thus may not converge to an optimal setting when the timer expires. In corner cases, no stable state of parameters can be reached. As discussed hereinafter in conjunction with FIG. 4, the present invention recognizes that serializing the LP TX filter and LD RX DFE adaptation is a more effective approach.

It is noted that both the TX and RX are equipped with channel equalization capabilities. By separating the two functions, one can spread the equalization cost to both ends, thus avoid overworking one circuit while keeping the other one underutilized. This strategy permits maximum usage and extracts most benefits of very limited resources. This can bring significant advantage to the system level design. An overequalized transmitter consumes more power and at the same time increases the noise contribution through crosstalk. For a better performance, one would like to have the transmitter output properly equalized or slightly under equalized. By isolating the TX adaptation from the RX adaptation, the present invention tunes each equalization parameter individually to a desired specification.

Figure 4:
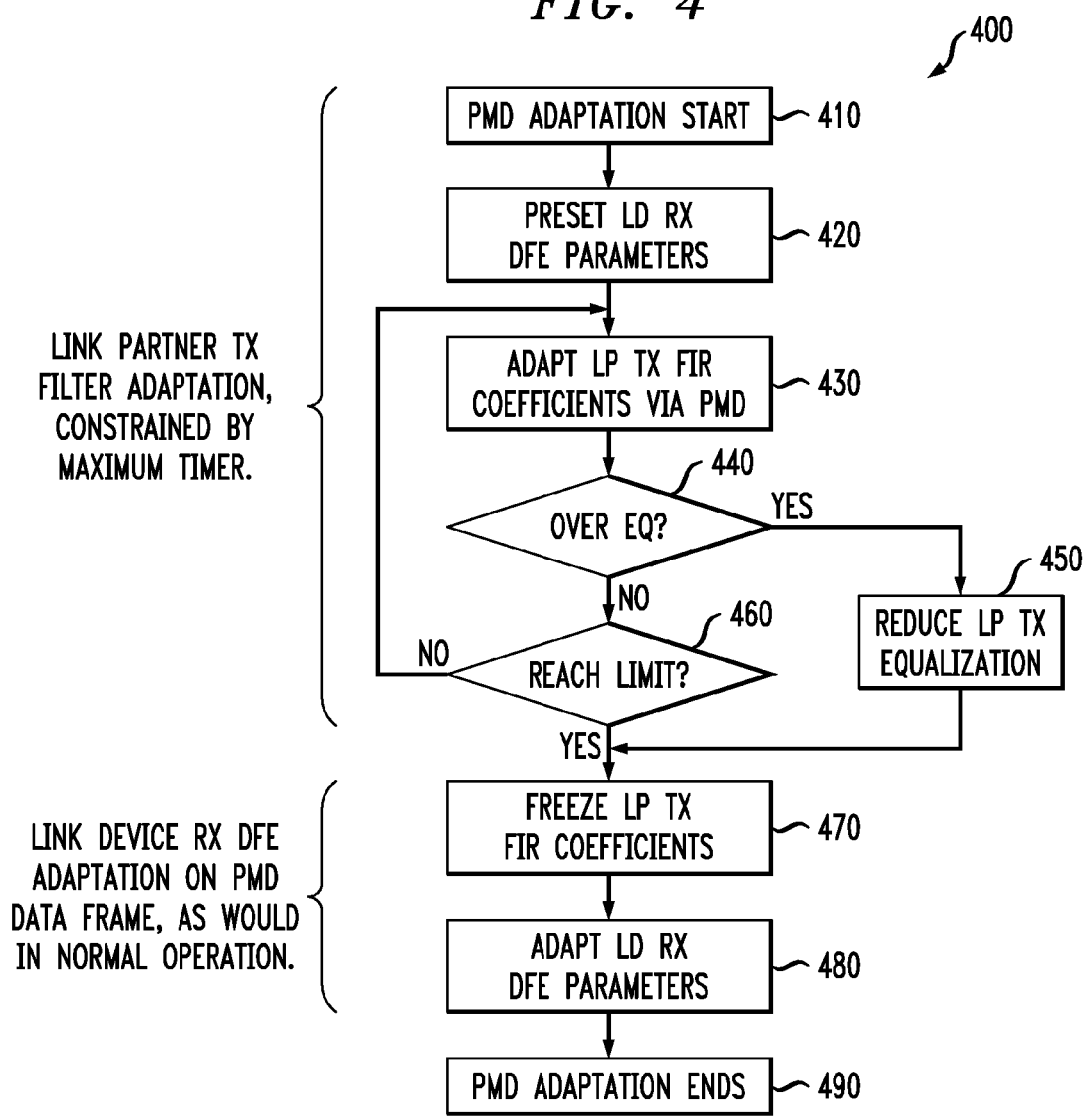
FIG. 4 is a flow chart of an exemplary PMD joint adaptation process incorporating features of the present invention.

FIG. 4 is a flow chart of an exemplary PMD joint adaptation process 400 incorporating features of the present invention. Generally, the PMD joint adaptation process 400 separates the TX adaptation and initially performs the TX adaptation in an exemplary embodiment to determine if the waveform is over-equalized before performing RX adaptation. The exemplary PMD joint adaptation process 400 is implemented by the link device 230. More particularly, the exemplary PMD joint adaptation process 400 is typically implemented by the PMD 262 of the link device 230. It is noted that corresponding steps (not shown) are performed by the link partner 210.

The PMD joint adaptation process 400 is initiated following the auto-negotiation (AN) (FIG. 1) that is performed when a link device 230 is coming out of reset. When auto-negotiation ends with an agreed speed (10G only at present time) with a link partner 210, the auto-negotiation sends a signal to the PMD 262 to start the joint adaptation process 400 as shown in FIG. 4. In one exemplary embodiment, Steps 410 to 490 of the PMD joint adaptation process 400 are state machine processes implemented within the PMD 262 (and/or on an embedded processor associated with PMD, such as an 8051 processor from Intel Corp.).

As shown in FIG. 4, the PMD joint adaptation process 400 is started during step 410. Thereafter, the LD RX DFE parameters are preset during step 420. During step 420, the PMD 262 sends a signal to freeze RX parameters of the ALE/DFE 260.

Generally, during steps 430-460, the PMD 262 continuously sends control information (e.g., a PMD training frame 300 of FIG. 3) to the link partner 210. The LP TX FIR coefficients are then adapted during step 430 via the PMD. The PMD 244 of the link partner 210 parses the packet content and adjusts the filter coefficients (FIG. 5) as the PMD 262 has requested, by incrementing (+1), decrementing (−1), or no change (0) for filter coefficients, $c_{-1}$, $c_0$, $c_1$, for the 3 taps. Once the PMD 244 completes the required action, the PMD 244 updates the status report field of FIG. 3 of its next PMD training frame 300 and sends the frame to the link device 230. The status can be "completed" or "not completed reaching limit."

A test is performed during step 440 to determine if the TX is overequalized. The link device 230 receiver front end (ALE 260) examines the incoming waveform from the link partner 210 through channel 250. If ALE 260 determines that the signal is over-equalized during step 440, the ALE 260 sends a signal to the PMD 262. The PMD 262 will then modify the coefficient update field of its next PMD training pattern 300 to instruct the link partner 210 during step 450 to reduce the TX pre-emphasis. This information is again taken by the PMD 244 of the link partner 210 and translated into a reduced pre-emphasis by equalizer 242.

Generally, an ideal signal, when observed in the frequency domain, should have a certain spectrum. When this signal passes through a channel, the output signal will have its spectrum modified by the channel and thus deviates from the ideal spectrum. A mechanism is used to change the signal such that the final spectrum remains unchanged. This process is called equalization.

For high speed communications, the channel usually has a low-pass characteristic. As a result, high frequency energy is attenuated more than the low frequency components. In this case, equalization attempts to boost the high frequency band and/or reduce low frequency band energy. If this boost restores the spectrum to its original one, then the equalization is called proper. If this boost is not enough, such that the high frequency energy is under-compensated, the amount of equalization is then called "under-equalization." If this boost is too much such that the high frequency energy is over-compensated, then the amount of equalization is called "over-equalization".

If it is determined during step 440 that the TX is not overequalized, then a further test is performed during step 460 to determine if the equalization limit has been reached. If the PMD 262 decodes the status field of the received training pattern 300 as "reaching limit" and it is determined during step 440 that there is no overequalization from the ALE/DFE 260, then there is no further LP TX modification. The PMD 262 will freeze the coefficient update field of remaining training patterns 300 using a code "no change," and the PMD 262 will send a signal to ALE/DFE 260 to start the RX DFE adaptation.

If it is determined during step 460 that the equalization limit has not been reached, then program control returns to step 430 and continues in the manner described above. If, however, it is determined during step 460 that the equalization limit has been reached, then the LP TX FIR coefficients are fixed during step 470. Thereafter, the LD RX DFE parameters are adapted during step 480 and the PMD adaptation ends during step 490.

The PMD joint adaptation process 400 ends when the receiver is satisfied with the result, usually by means of internal or external bit error rate test (BERT) measurements or eye diagram/contour checking, in a known manner. There may also be a maximum time limit, for example, of 500 ms, for joint adaptation. Thus, the process 400 ends when either the timer expires or the link device 230 is satisfied with the result of joint adaptation. The PMD function completes and stops sending the training patterns and normal data traffic starts.

Figure 5:
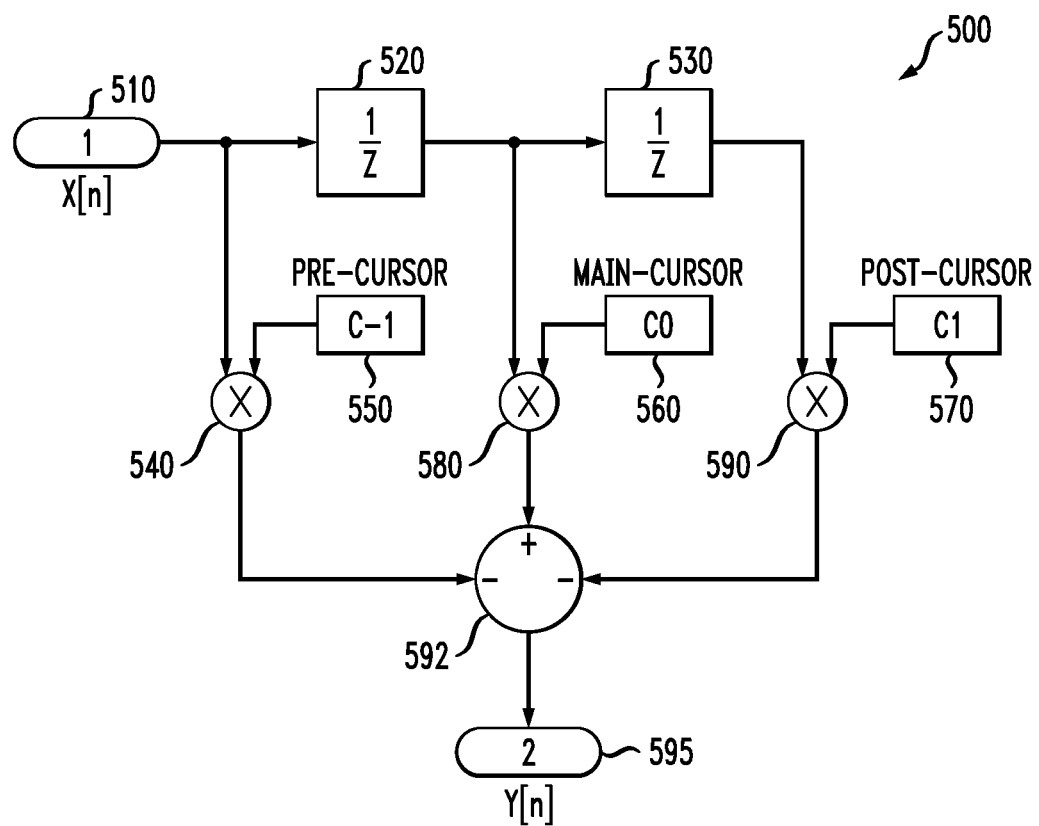
FIG. 5 is a schematic block diagram of an exemplary TX 3-tap transversal filter pursuant to the 10GBASE-KR standard.

FIG. 5 is a schematic block diagram of an exemplary TX 3-tap transversal filter 500 pursuant to the 10GBASE-KR standard. As shown in FIG. 5, the 3 taps are typically referred to as pre-cursor 550, main-cursor 560 and post-cursor 570. During the joint equalization adaptation process, the filter coefficients, $c_{-1}$, $c_0$, $c_1$, for the 3 taps (or tap weights) are adjusted between a pair of 10GBASE-KR-compliant PHY Serializer-Deserializer (SerDes) devices (LP and LD). A deficiency in one prior adaptation algorithm is that the main cursor $c_0$ has a fixed value and is not adaptive. The disclosed algorithm enables full adaptation of all filter coefficients, $c_{-1}$, $c_0$, $c_1$. For simplicity, a 3-tap filter is employed as an example to illustrate the disclosed algorithm. However, the algorithms and implementations described below, can be easily extended to a transmit FIR filter of arbitrary tap length, as would be apparent to a person of ordinary skill in the art. Thus, cases over three taps are considered to be covered by the present invention as well.

As shown in FIG. 5, x[n] 510 represents a digital signal sampled at instant $n*\Delta_t$. Therefore, x[n−1] is the signal at an earlier sampling instant and x[n+1] is a later sample. Since it is a digital signal, the sample is either logic 1 or 0 (sometimes referred to as +1 and −1).

As shown in FIG. 5, blocks 520 and 530 represent a unit delays, which is equal to one unit interval (UI) for NRZ signaling. Thus, the signal through block 590 is one UI earlier than that through block 580 and is two UI periods earlier than that through block 540.

Now, the signals at three consecutive sampling blocks are modified by, $c_{-1}$, $c_0$, and $c_1$ such that, when combined at the adder 592, the output 595 becomes the pre-emphasized signal. The signs at the adder are important. In the embodiment of FIG. 5, the low frequency energy is reduced, which is equivalent to a relative boost at high frequencies.

Joint Adaptation Algorithm

As previously indicated, the present invention provides an improved joint adaptation algorithm for the link device RX to determine the optimal filter coefficients, $c_k$, of the link partner TX (and, respectively, for the link partner RX to determine link device TX filter coefficients, $c_k$).

Figure 6:
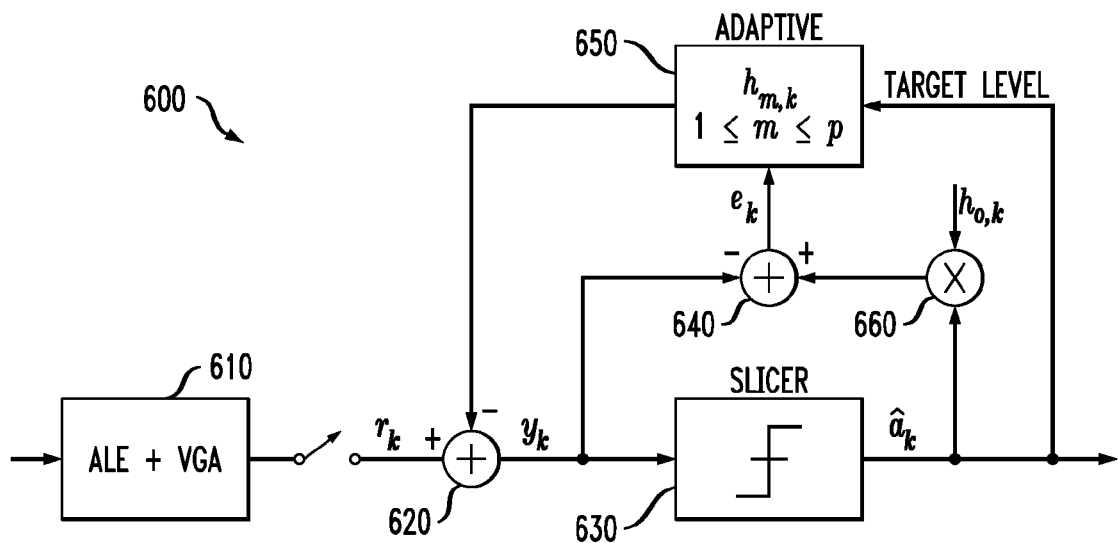
FIG. 6 is a schematic block diagram of the equalization components of a conventional receiver circuit.

FIG. 6 is a schematic block diagram of the equalization components of a conventional receiver circuit 600. As shown in FIG. 6, the signal is first processed by an Analog Linear Equalizer and Voltage Gain Amplifier 610, having an output signal, $r_k$. The signal $r_k$, modified by the output from block 650, produces signal $y_k$. $y_k$ is then sampled by the slicer block 630 to get a digital signal $\hat{a}_k$ (an estimate of what was transmitted). It is noted that $r_k$ and $y_k$ are analog signals.

At block 660, $\hat{a}_k$ is modified by $h_{o,k}$, which is now an analog signal. This signal is compared with the input at the slicer, $y_k$. The comparison produces $e_k$, which is an error term. This error, together with the current decision ($\hat{a}_k$) and some earlier decisions ($\hat{a}_{k-1}$, $\hat{a}_{k-2}$, and so on), will be processed by an adaptive algorithm at block 650. The output from the "adaptive" block 650 is the feedback to block 620. Note, the description "Target level" is for "$h_{o,k}$".

$r_k$, at the output of block 610, can be obtained as a convolution of the transmit data $a_k$, the transmit filter $c_k$ and the channel $p_k$ as follows:

$$r_k = a_k * c_k * p_k = \Sigma_j(c_j \Sigma_i(a_{k-j-i} p_i)) \quad (1)$$

As shown in FIG. 6, the input signal $y_k$ to the slicer is defined as:

$$y_k = r_k - \Sigma_{1 \leq m \leq p}(h_m \hat{a}_{k-m}). \quad (2)$$

The error $e_k$ is defined as:

$$e_k = \hat{a}_k h_0 - y_k. \quad (3)$$

Taking equations (1) and (2) into equation (3) and using $\hat{a}_k$ as an estimate for $a_k$ in (1), one can express $e_k$ as:

$$e_k = C_{RX} - \Sigma_j(c_j \Sigma_i(\hat{a}_{k-j-i} p_i)), \quad (4)$$

where:

$$C_{RX} = \hat{a}_k h_0 + \Sigma_{1 \leq m \leq p}(h_m \hat{a}_{k-m}). \quad (5)$$

In FIG. 4, the receiver DFE parameters $h_m$, $0 \leq m \leq p$ are preset in the link device (LD) for link partner (LP) transmitter filter adaptation. Therefore, $C_{RX}$ is not a function of transmitter filter coefficients $c_j$ and:

$$\partial e_k / \partial c_j = -\Sigma_i (a_{k-j-i} p_i). \tag{6}$$

Applying the sign-sign least-mean-square (LMS) adaptive algorithm, one can obtain the TX filter coefficients:

$$c_{j,k} = c_{j,k-1} - \text{sign}(e_k)\text{sign}(\partial e_k / \partial c_j) \tag{7}$$
$$= c_{j,k-1} + \text{sign}(e_k)\text{sign}\left(\sum_i (a_{k-j-i} p_i)\right).$$

In general, one does not process a prior knowledge of backplane characteristics, and therefore the actual values of $p_i$.

Figure 7:
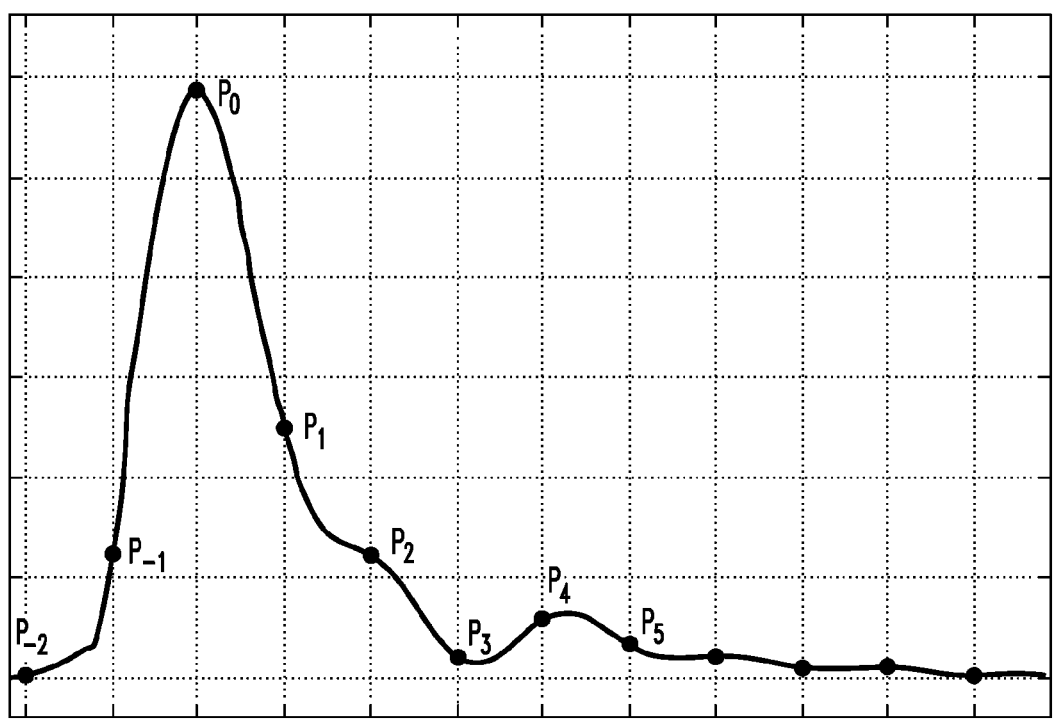
FIG. 7 illustrates an impulse response for an exemplary backplane channel.

FIG. 7 illustrates an impulse response for an exemplary backplane channel. For a practical channel, such as the exemplary channel in FIG. 7, the impulse response is usually dominated by $p_i$, $-1 \leq i \leq 3$. With that, the TX filter coefficients $c_{-1}$ can be expressed for the precursor, $c_0$ for the main cursor and $c_1$ for the post cursor from equation (7), as shown in equation (8). It is important to note that $\hat{a}_k$ has a value of either 1 or −1.

$$c_{-1,k} = c_{-1,k-1} + \text{sign}(e_k)\text{sign}(\hat{a}_{k+2} p_{-1} + \hat{a}_{k+1} p_0 + \hat{a}_k p_1 + \hat{a}_{k-1} p_2 + \hat{a}_{k-2} p_3),$$

$$c_{0,k} = c_{0,k-1} + \text{sign}(e_k)\text{sign}(\hat{a}_{k+1} p_{-1} + \hat{a}_k p_0 + \hat{a}_{k-1} p_1 + \hat{a}_{k-2} p_2 + \hat{a}_{k-3} p_3),$$

$$c_{1,k} = c_{1,k-1} + \text{sign}(e_k)\text{sign}(\hat{a}_k p_{-1} + \hat{a}_{k-1} p_0 + \hat{a}_{k-2} p_1 + \hat{a}_{k-3} p_2 + \hat{a}_{k-4} p_3), \tag{8}$$

Adaptation Algorithms

Algorithm-I: Frequently $p_0$ is the most dominant value. However, it would be incorrect to assume that all $p_i$ have identical values. For the first algorithm, $p_0$ is assumed to be the main concern on the channel, so $p_0=1$ and $p_i=0$ for $i \neq 0$. Thus, equation (8) can be expressed as follows:

$$c_{-1,k} = c_{-1,k-1} + \text{sign}(e_k)\text{sign}(\hat{a}_{k+1}),$$

$$c_{0,k} = c_{0,k-1} + \text{sign}(e_k)\text{sign}(\hat{a}_k),$$

$$c_{1,k} = c_{1,k-1} + \text{sign}(e_k)\text{sign}(\hat{a}_{k-1}). \tag{9}$$

Equation (9) is much simpler than existing algorithms, while providing full adaptation of all TX filter coefficients of the link partner. It can be shown that with Algorithm-I, the RX front end VGA gain is −6 dB, −4 dB, −2 dB, 0 dB, 2 dB, 4 dB, and 6 dB.

Algorithm-II: The adaptation algorithm-I can have the transmit output over-equalized in some cases, thus limiting the useful range of receiver target level. This can be corrected by replacing the strong contributor of $p_0$ with a weaker $p_1$ for the post cursor, and extending the precursor contributor to include $p_{-1}$.

$$c_{-1,k} = c_{-1,k-1} + \text{sign}(e_k)\text{sign}(\hat{a}_{k+2} + \hat{a}_{k+1}),$$

$$c_{0,k} = c_{0,k-1} + \text{sign}(e_k)\text{sign}(\hat{a}_k),$$

$$c_{1,k} = c_{1,k-1} + \text{sign}(e_k)\text{sign}(\hat{a}_{k-2}). \tag{10}$$

Equation (10) is still simpler than existing algorithms and provides full adaptation of all TX filter coefficients of the link partner. It can be shown that with Algorithm-II, the RX front end VGA gain is −6 dB, −4 dB, −2 dB, 0 dB, 2 dB, 4 dB, and 6 dB. It has been observed that with Algorithm-II, no transmitter over-equalization occurred, which is desirable in the system. It is noted that a partially closed eye delivered to the RX is actually a good thing for the following main reasons: (1) the RX often has strong equalization capabilities, but usually cannot re-process an over-equalized signal; (2) for the same signal amplitude, an under-equalized signal requires much less signal output from the TX, thus reducing overall system power consumption; (3) a reduced TX output works as a weaker crosstalk aggressor, which improves system SNR (signal-to-noise ratio).

Algorithm-III: Algorithm-III improves upon algorithm-II by balancing out the strong contributor of $p_0$ with weaker contributors of $p_1$, $p_2$ and $p_3$ for the post cursor.

$$c_{-1,k} = c_{-1,k-1} + \text{sign}(e_k)\text{sign}(\hat{a}_{k+2} + \hat{a}_{k+1}),$$

$$c_{0,k} = c_{0,k-1} + \text{sign}(e_k)\text{sign}(\hat{a}_k),$$

$$c_{1,k} = c_{1,k-1} + \text{sign}(e_k)\text{sign}(\hat{a}_{k-1} + \hat{a}_{k-2} + \hat{a}_{k-3} + \hat{a}_{k-4}). \tag{11}$$

The overall complexity of equation (11) is still simpler than existing designs and it also provides full adaptation of all TX filter coefficients of the link partner. It can be shown that with Algorithm-II, the RX front end VGA gain is −6 dB, −4 dB, −2 dB, 0 dB, 2 dB, 4 dB, and 6 dB.

It has been observed that Algorithm-III has better performance with slightly increased complexity compared to the disclosed algorithm-II. For some cases that use algorithm-II, the channel is under-equalized by the transmitter. It may require a good receiver equalizer to ensure error-free data communication. Algorithm-III can work with less efficient receiver side equalizer and much wider range of target level.

To summarize, for Algorithm-II and Algorithm-III, on the $c_{-1}$ coefficient, the first pre-cursor and main cursor are employed. For all three algorithms, on the $c_0$ coefficient, only the main cursor is used. For the $c_1$ coefficient, only the first post-cursor is used for Algorithm-II and more than one post-cursor is used for Algorithm-III.

Unified Implementation with Programmable Profile Selection

Figures 8, 9:
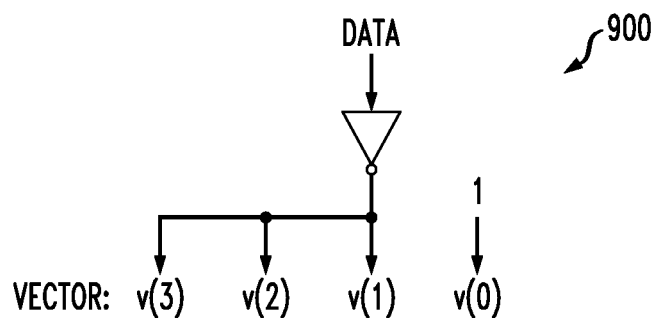
FIG. 8 is a table summarizing programmable profile values for exemplary algorithms in accordance with the present invention.
FIG. 9 is a circuit diagram illustrating a 2's complement vector converter.

Upon examination of equations (9-11), it can be seen that algorithm I, II and III are variations of equation (8) with different $p_i$ values. For hardware and software implementations, one can store these values in user programmable registers, further extending the flexibility of the baseline architecture. FIG. 8 is a table 800 summarizing the programmable profile values for algorithm I, II and III as discussed further below in conjunction with FIG. 10. In general, each value stored in the table 800 is a vector with each entry in the vector indicating whether the corresponding filter tap (e.g., pre-, main and post cursor taps) contribute to the coefficient computation. The value of $\hat{a}_k$ in the digital domain is binary with 0 representing integer −1.

FIG. 9 is a circuit diagram illustrating a 2's complement vector converter 900. The data converter 900 replaces a binary value 0 (integer −1) with a 4-bit vector 1111, which is a 2's complement representation of −1. Similarly, the data converter 900 converts a binary value 1 (integer 1) to a 4-bit vector 0001. It should be evident that one can extend the size of the profile to any arbitrary length, as a given application permits, as would be apparent to a person of ordinary skill in the art.

In FIG. 9, for the algorithms I, II, III shown, only the sign value is used and the sum is discarded. However, one can easily extend the concept as illustrated here and utilize the sum to create multi-level decision making for coefficients update. This can be considered as an extension to the 10GBASE-KR standard, where one can not only increment or decrement the values, i.e., plus one or subtract by one to the coefficients, but also increase or decrease the coefficient by more-than-one based upon the sum values of FIG. 10. It may allow a fast convergence of filter coefficients, thus speed up the system start up time.

Figure 10:
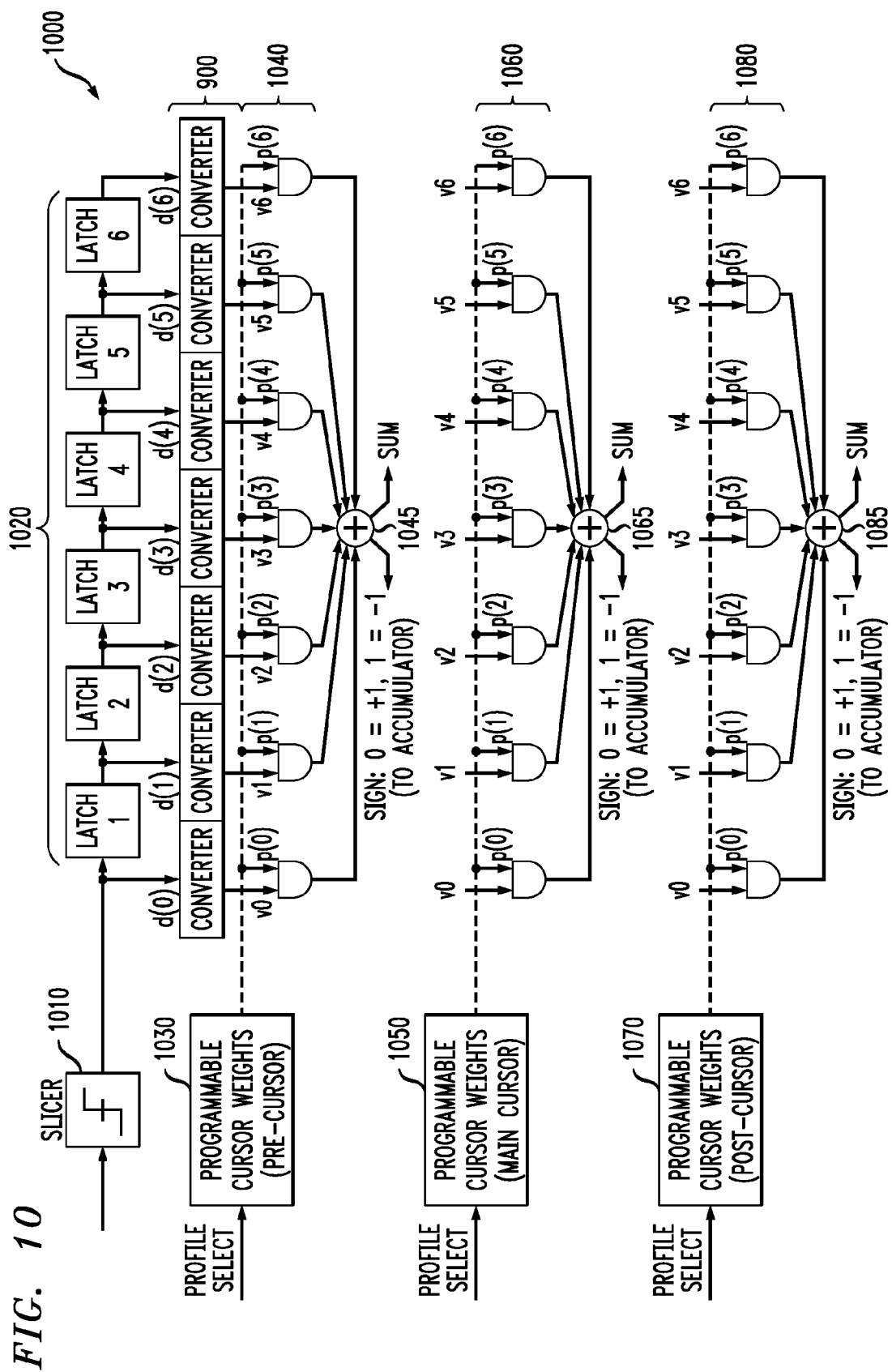
FIG. 10 is a diagram illustrating an exemplary hardware implementation of the disclosed unified joint adaptation algorithm.

FIG. 10 is a diagram illustrating an exemplary hardware implementation 1000 of the disclosed unified joint adaptation algorithm. As shown in FIG. 10, a received signal is first applied to a slicer 1010 and is then sampled by a plurality of serial latches 1020. The data values d(0) . . . d(6) are then each applied to a corresponding 2's complement vector converter 900 of FIG. 9. The four bit vectors v0 . . . v6 generated by each 2's complement vector converter 900 are then applied to a corresponding AND gate 1040 with the programmable cursor weights p-1(0) . . . p-1(6) for the pre-cursor tap, as obtained from stage 1030. The outputs of the AND gates 1040 are then summed by an adder 1045.

Likewise, for the main cursor, the four bit vectors v0 . . . v6 generated by each 2's complement vector converter 900 are then applied to a corresponding AND gate 1060 with the programmable cursor weights p0(0) . . . p0(6) for the main cursor tap, as obtained from stage 1050. The outputs of the AND gates 1060 are then summed by an adder 1065. Finally, for the post-cursor, the four bit vectors v0 . . . v6 generated by each 2's complement vector converter 900 are then applied to a corresponding AND gate 1080 with the programmable cursor weights p1(0) . . . p1(6) for the post-cursor tap, as obtained from stage 1070. The outputs of the AND gates 1080 are then summed by an adder 1085.

CONCLUSION

Among other benefits, the disclosed algorithms provide full adaptation of all transmitter filter coefficients of a link partner. In this manner, the disclosed algorithms conform to high data rate interconnect standards. A 3-tap TX filter is specified by 10GBASE-KR standard. In addition, the disclosed algorithms have a wider range for receiver target level ($h_0$). Consequently, the disclosed algorithms are able to maximize the signal-to-noise ratio (SNR).

The disclosed algorithms and implementations provide flexibility to select cursor tap strength. As a result, the disclosed algorithms and implementations can prevent putting all equalization burdens on the TX side and/or underutilize the receiver equalizer. A system utilizing the disclosed algorithms is able to distribute the equalization requirements between the link device and link partner. This load balancing permits both ends to operate at or near an optimal performance level.

The selectivity of tap strength permits the receiver to tune the transmitter output power in order to optimize system power. In addition, the selectivity of tap strength can be used to minimize the crosstalk at the transmitter side, thus enhancing overall system performance.

While the present invention is illustrated in the context of the 10GBASE-KR standard, the disclosed algorithms can be extended to other multi-tap filters beyond the scope of 10GBASE-KR, as would be apparent to a person of ordinary skill in the art. The implementation also provides a means to adjust the filter coefficients non-sequentially.

A complete PMD joint adaptation flow is obtained, where link partner and link device adaptation is serialized to ensure a faster adaptation while minimizing erroneous perturbations to filter coefficients.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. A method for joint adaptation of filter coefficient values in two communicating devices, said method comprising:
adapting said filter coefficient values in a first of said two communicating devices until a predefined stopping criteria is satisfied; and
adapting said filter coefficient values in a second of said two communicating devices once said predefined stopping criteria for said first communicating device is satisfied, wherein said first and second communicating devices are remote from one another and wherein said filter coefficient values in said first of said two communicating devices and said filter coefficient values in said second of said two communicating devices jointly configure an amount of equalization for a communication channel between said two remote communicating devices.

2. The method of claim 1, wherein said filter coefficient values in said first communicating device comprise coefficient values of a finite impulse response filter in a transmitter of a link partner.

3. The method of claim 1, wherein said filter coefficient values in said second communicating device comprise parameter values of a decision feedback equalizer in a receiver of a link device.

4. The method of claim 1, wherein said two communicating devices comprise a link partner and a link device.

5. The method of claim 1, wherein said predefined stopping criteria determines whether said first of said two communicating devices is overequalized.

6. The method of claim 1, further comprising the step of maintaining said filter coefficient values in said first communicating device when said predefined stopping criteria for said first communicating device is satisfied.

7. The method of claim 1, further comprising the step of presetting decision feedback equalization parameters in said link device.

8. The method of claim 1, wherein said filter coefficient values comprise coefficient values of a multi-tap filter.

9. The method of claim 1, wherein said filter coefficient values are determined by including a contribution of only a main-cursor channel impulse response.

10. The method of claim 1, wherein said filter coefficient values are determined by including a contribution of only a main-cursor, a first post-cursor and a first pre-cursor channel impulse response.

11. The method of claim 1, wherein said filter coefficient values are determined by including a contribution of a main-cursor, a first pre-cursor and at least one post-cursor channel impulse response.

12. The method of claim 1, further comprising the step of obtaining one or more programmable profile values from a register, wherein said one or more programmable profile values indicate cursor tap values that contribute to said filter coefficient values.

13. An apparatus for joint adaptation of filter coefficient values in two communicating devices, said apparatus comprising:
a memory; and
at least one processor, coupled to the memory, operative to:
adapt said filter coefficient values in a first of said two communicating devices until a predefined stopping criteria is satisfied; and
adapt said filter coefficient values in a second of said two communicating devices once said predefined stopping criteria for said first communicating device is satisfied, wherein said first and second communicating devices are remote from one another and wherein said filter coefficient values in said first of said two communicating devices and said filter coefficient values in said second of said two communicating devices jointly configure an amount of equalization for a communication channel between said two remote communicating devices.

14. The apparatus of claim 13, wherein said filter coefficient values in said first communicating device comprise coefficient values of a finite impulse response filter in a transmitter of a link partner.

15. The apparatus of claim 13, wherein said filter coefficient values in said second communicating device comprise parameter values of a decision feedback equalizer in a receiver of a link device.

16. The apparatus of claim 13, wherein said two communicating devices comprise a link partner and a link device.

17. The apparatus of claim 13, wherein said predefined stopping criteria determines whether said first of said two communicating devices is overequalized.

18. The apparatus of claim 13, wherein said processor is further configured to maintain said filter coefficient values in said first communicating device when said predefined stopping criteria for said first communicating device is satisfied.

19. The apparatus of claim 13, wherein said processor is further configured to preset decision feedback equalization parameters in said link device.

20. The apparatus of claim 13, wherein said filter coefficient values comprise coefficient values of a multi-tap filter.

21. The apparatus of claim 13, wherein said filter coefficient values are determined by including a contribution of only a main-cursor channel impulse response.

22. The apparatus of claim 13, wherein said filter coefficient values are determined by including a contribution of only a main-cursor, a first post-cursor and a first pre-cursor channel impulse response.

23. The apparatus of claim 13, wherein said filter coefficient values are determined by including a contribution of a main-cursor, a first pre-cursor and at least one post-cursor channel impulse response.

24. The apparatus of claim 13, further comprising a register for storing one or more programmable profile values, wherein said one or more programmable profile values indicate cursor tap values that contribute to said filter coefficient values.

25. The apparatus of claim 13, wherein said apparatus is a physical medium dependent block in a link device.

* * * * *